(12) United States Patent
Lee

(10) Patent No.: US 12,341,176 B2
(45) Date of Patent: Jun. 24, 2025

(54) BATTERY RACK AND POWER STORAGE APPARATUS COMPRISING SAME

(71) Applicant: LG ENERGY SOLUTION, LTD., Seoul (KR)

(72) Inventor: Jin-Kyu Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 549 days.

(21) Appl. No.: 17/625,254

(22) PCT Filed: Jul. 10, 2020

(86) PCT No.: PCT/KR2020/009121
§ 371 (c)(1),
(2) Date: Jan. 6, 2022

(87) PCT Pub. No.: WO2021/010677
PCT Pub. Date: Jan. 21, 2021

(65) Prior Publication Data
US 2022/0263162 A1    Aug. 18, 2022

(30) Foreign Application Priority Data
Jul. 17, 2019 (KR) .................. 10-2019-0086397

(51) Int. Cl.
*H01M 10/6568* (2014.01)
*H01M 10/42* (2006.01)
(Continued)

(52) U.S. Cl.
CPC ..... *H01M 10/6568* (2015.04); *H01M 10/425* (2013.01); *H01M 10/486* (2013.01); *H01M 10/613* (2015.04); *H01M 10/63* (2015.04)

(58) Field of Classification Search
CPC ........... H01M 10/6568; H01M 10/613; H01M 10/63; H01M 10/42; H01M 10/425; H01M 10/48; H01M 10/486
See application file for complete search history.

(56) References Cited

U.S. PATENT DOCUMENTS

2009/0317694 A1    12/2009    Angquist et al.
2012/0176080 A1    7/2012    Uchihashi et al.
(Continued)

FOREIGN PATENT DOCUMENTS

CN    104466276 A  *  3/2015    ............ H01M 10/42
CN    106684499 A  *  5/2017    ............... A62C 3/16
(Continued)

OTHER PUBLICATIONS

International Search Report for PCT/KR2020/009121 mailed on Oct. 27, 2020.
(Continued)

*Primary Examiner* — Karie O'neill Apicella
(74) *Attorney, Agent, or Firm* — Birch, Stewart, Kolasch & Birch, LLP

(57) ABSTRACT

An energy storage system includes a plurality of battery modules, a rack case configured to accommodate the plurality of battery modules, a coolant tank provided to an upper side of the rack case and containing a predetermined coolant, a pipe unit configured to connect the coolant tank and the plurality of battery modules, and a valve unit provided between the pipe unit and the coolant tank and configured to be opened when at least one battery module has a temperature over a predetermined temperature among the plurality of battery modules to discharge the coolant of the coolant tank to the pipe unit so that the coolant is supplied to the battery module over the predetermined temperature.

12 Claims, 7 Drawing Sheets

(51) Int. Cl.
   *H01M 10/48* (2006.01)
   *H01M 10/613* (2014.01)
   *H01M 10/63* (2014.01)

(56) References Cited

U.S. PATENT DOCUMENTS

| | | | |
|---|---|---|---|
| 2013/0017421 A1 | 1/2013 | Onnerud et al. | |
| 2015/0311572 A1 | 10/2015 | Sung et al. | |
| 2018/0212287 A1 | 7/2018 | Hong et al. | |
| 2019/0097288 A1* | 3/2019 | Oh | H01M 10/6556 |
| 2019/0319317 A1 | 10/2019 | Koujiya et al. | |

FOREIGN PATENT DOCUMENTS

| | | | | |
|---|---|---|---|---|
| CN | 107069140 A * | 8/2017 | | B60L 11/18 |
| CN | 109103539 A | 12/2018 | | |
| CN | 208723049 U | 4/2019 | | |
| CN | 209119279 U | 7/2019 | | |
| JP | 2012-199205 A | 10/2012 | | |
| JP | 2014-116114 A | 6/2014 | | |
| JP | 2015-220177 A | 12/2015 | | |
| JP | 6144647 B2 | 6/2017 | | |
| JP | 2018-055768 A | 4/2018 | | |
| JP | 2018-063765 A | 4/2018 | | |
| JP | 2019-075191 A | 5/2019 | | |
| KR | 10-1340365 B1 | 12/2013 | | |
| KR | 10-1724296 B1 | 4/2017 | | |
| KR | 10-2017-0064449 A | 6/2017 | | |
| KR | 10-2017-0103170 A | 9/2017 | | |
| KR | 10-1778666 B1 | 9/2017 | | |
| KR | 10-2018-0096081 A | 8/2018 | | |
| KR | 10-1910739 B1 | 10/2018 | | |
| WO | WO 2012/015000 A1 | 2/2012 | | |
| WO | WO2017/033412 A1 | 6/2018 | | |
| WO | WO 2018/135507 A1 | 7/2018 | | |
| WO | WO-2019017342 A1 * | 1/2019 | | F16B 7/025 |

OTHER PUBLICATIONS

Extended European Search Report for European Application No. 20840018.4, dated Jun. 30, 2022.

* cited by examiner

BATTERY RACK AND POWER STORAGE APPARATUS COMPRISING SAME

TECHNICAL FIELD

The present disclosure relates to a battery rack and an energy storage system including the battery rack.

The present application claims priority to Korean Patent Application No. 10-2019-0086397 filed on Jul. 17, 2019 in the Republic of Korea, the disclosures of which are incorporated herein by reference.

BACKGROUND ART

Secondary batteries which are highly applicable to various products and exhibit superior electrical properties such as high energy density, etc. are commonly used not only in portable devices but also in electric vehicles (EVs) or hybrid electric vehicles (HEVs) driven by electrical power sources. The secondary battery is drawing attentions as a new energy source for enhancing environment friendliness and energy efficiency in that the use of fossil fuels can be reduced greatly and no byproduct is generated during energy consumption.

Secondary batteries widely used at present include lithium ion batteries, lithium polymer batteries, nickel cadmium batteries, nickel hydrogen batteries, nickel zinc batteries and the like. An operating voltage of the unit secondary battery cell, namely a unit battery cell, is about 2.5V to 4.5V. Therefore, if a higher output voltage is required, a plurality of battery cells may be connected in series to configure a battery pack. In addition, depending on the charge/discharge capacity required for the battery pack, a plurality of battery cells may be connected in parallel to configure a battery pack. Thus, the number of battery cells included in the battery pack may be variously set according to the required output voltage or the demanded charge/discharge capacity.

Meanwhile, when a plurality of battery cells are connected in series or in parallel to configure a battery pack, it is common to configure a battery module including at least one battery cell first, and then configure a battery rack by using at least one battery module and adding other components. Here, according to various voltage and capacity requirements, an energy storage system may be configured to include at least one battery rack that includes at least one battery module.

In the case of a conventional battery rack, when an abnormal situation occurs in at least one battery module among the plurality of battery modules in the rack case, ignition may occur in the battery module in which the abnormal situation occurs.

When ignition occurs in any one of the battery modules, if flame and heat propagate to the surrounding battery modules adjacent thereto, it may lead to additional ignition, resulting in serious property damage or great personal injury.

Therefore, there is a need for a method of providing a battery rack capable of preventing flame and heat from propagating to adjacent battery modules more rapidly when at least one of the battery modules is ignited, and a power storage device including the same.

DISCLOSURE

Technical Problem

Therefore, the present disclosure is directed to providing a battery rack, which may more rapidly prevent the propagation of flame and heat to adjacent battery modules when ignition occurs in at least one of battery modules, and an energy storage system including the battery rack.

Technical Solution

In one aspect of the present disclosure, there is provided a battery rack, comprising: a plurality of battery modules stacked on each other along a vertical direction of the battery rack, each battery module of the a plurality of battery modules having at least one battery cell; a rack case configured to accommodate the plurality of battery modules; a coolant tank provided to an upper side of the rack case and containing a coolant; a pipe configured to connect the coolant tank and the plurality of battery modules; and a valve provided between the pipe and the coolant tank and configured to be opened when at least one battery module of the a plurality of battery modules has a temperature over a predetermined temperature to discharge the coolant of the coolant tank to the pipe so that the coolant is supplied to the at least one battery module having a temperature over the predetermined temperature.

The battery rack may further comprise at least one temperature sensor provided to the rack case to sense the temperature of the plurality of battery modules.

The valve may include a valve body configured to connect the coolant tank and the pipe and having a valve flow path for the flow of the coolant; and an opening/closing valve provided to be opened or closed in the valve body and configured to close the valve flow path when the temperature of the plurality of battery modules is lower than the predetermined temperature and to open the valve flow path when the temperature of at the least one battery module of the plurality of battery modules is higher than the predetermined temperature.

The battery rack may further comprise a control unit electrically connected to the at least one temperature sensor and the valve to control the operation of the valve.

The pipe may include a main pipe connected to the valve; and a plurality of module pipes connected to the main pipe and respectively connected to the plurality of battery modules.

The main pipe may be elongated to have a predetermined length along the vertical direction of the rack case.

The plurality of module pipes may be disposed to be spaced apart from each other by a predetermined distance along the vertical direction of the rack case.

The main pipe may include a hydraulic pressure adjuster configured to adjust a hydraulic pressure according to a height of the main pipe.

The hydraulic pressure adjuster may be provided to an inner wall of the main pipe and be disposed between the plurality of module pipes, respectively, in a vertical direction of the main pipe.

The coolant may be water.

In addition, the present disclosure also provides an energy storage system, comprising at least one battery rack according to the above embodiments.

Advantageous Effects

According to various embodiments as above, it is possible to provide a battery rack, which may prevent the propagation of flame and heat to adjacent battery modules more rapidly when ignition occurs in at least one of battery modules, and an energy storage system including the battery rack.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

The present disclosure will become more apparent by describing in detail the embodiments of the present disclosure with reference to the accompanying drawings. It should be understood that the embodiments disclosed herein are illustrative only for better understanding of the present disclosure, and that the present disclosure may be modified in various ways. In addition, for ease understanding of the present disclosure, the accompanying drawings are not drawn to real scale, but the dimensions of some components may be exaggerated.

Figure 1:
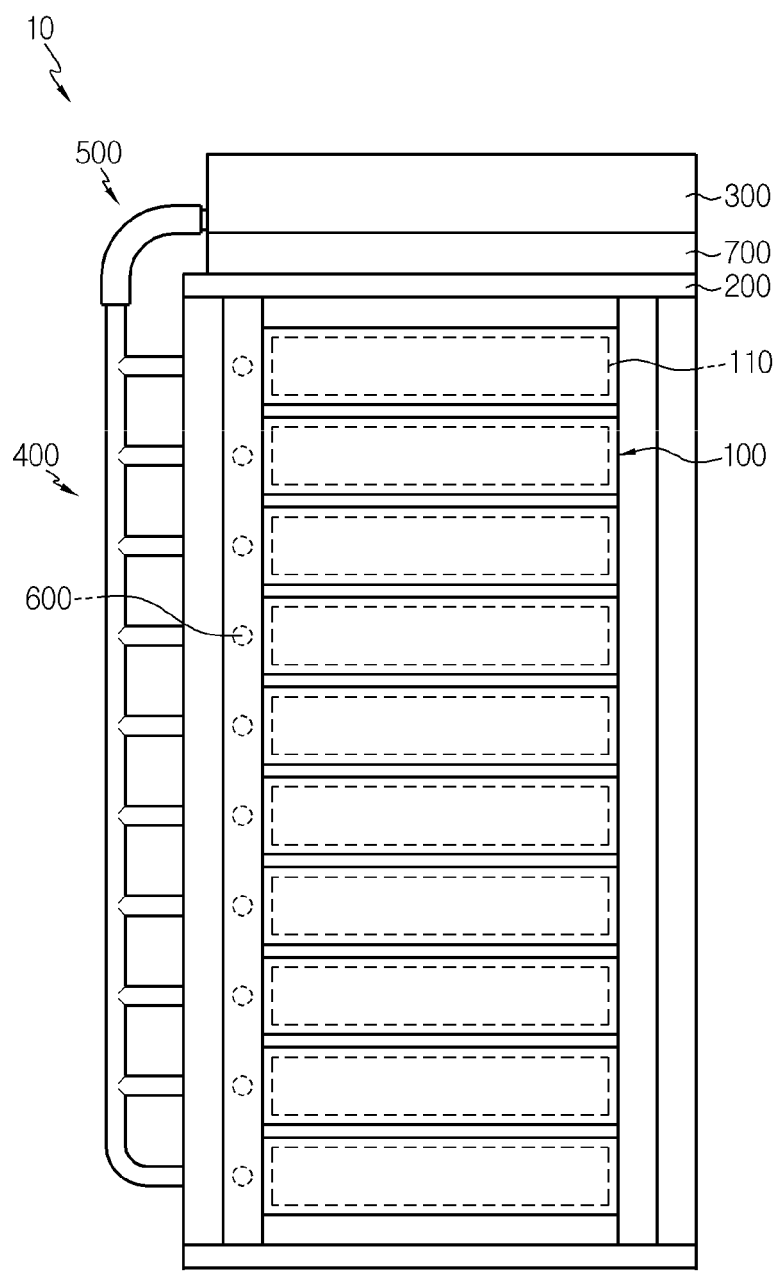
FIG. 1 is a diagram for illustrating a battery rack according to an embodiment of the present disclosure.
Figure 2:
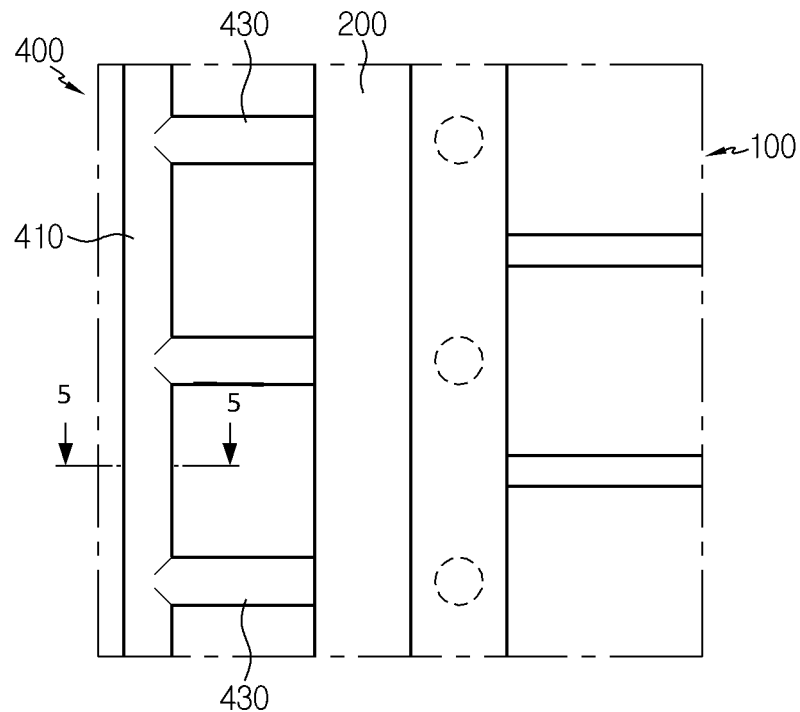
FIG. 2 is a diagram for illustrating a pipe unit of the battery rack of the energy storage system of FIG. 1.
Figure 3:
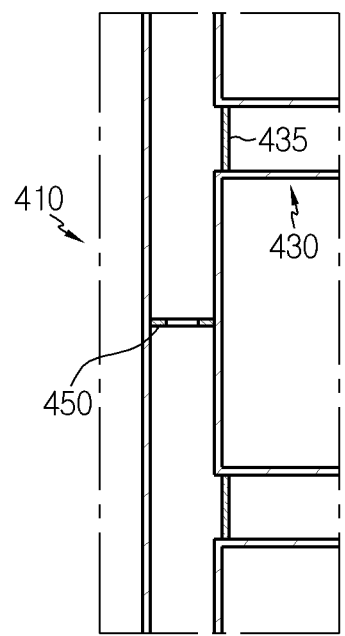
FIG. 3 is a partially sectioned view showing the pipe unit of FIG. 2.
Figure 4:
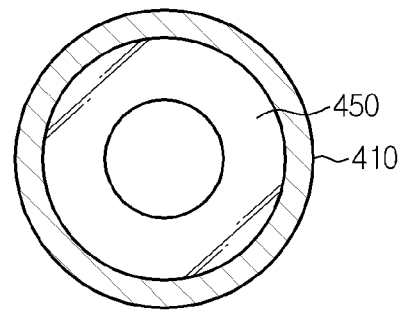
FIG. 4 is a sectioned view showing the pipe unit of FIG. 2.
Figure 5:
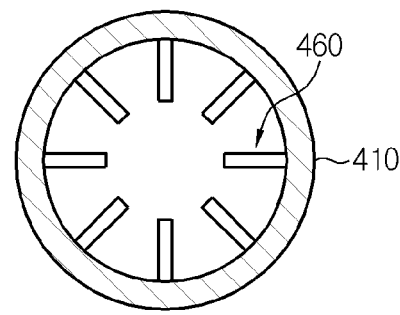
FIGS. 5 and 6 are diagrams for illustrating hydraulic pressure adjusting units according to various embodiments of the pipe unit of FIG. 2, taken along the line 5-5.
Figure 6:
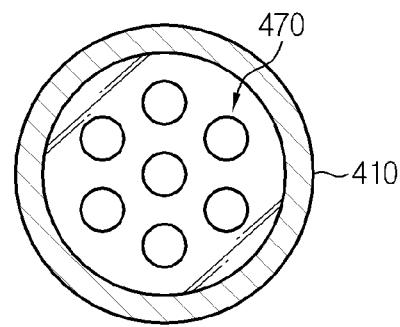
Figure 7:
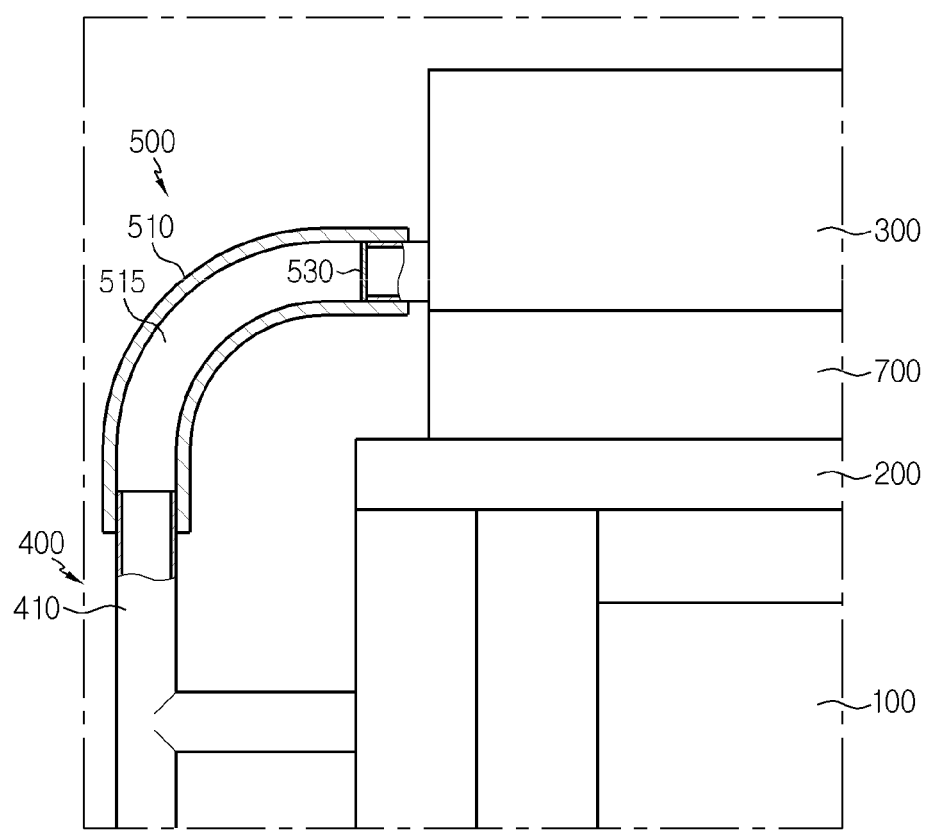
FIG. 7 is a diagram for illustrating a valve unit of the battery rack of FIG. 1.

FIG. 1 is a diagram for illustrating a battery rack according to an embodiment of the present disclosure, FIG. 2 is a diagram for illustrating a pipe unit of the battery rack of the energy storage system of FIG. 1, FIG. 3 is a partially sectioned view showing the pipe unit of FIG. 2, FIG. 4 is a sectioned view showing the pipe unit of FIG. 2, FIGS. 5 and 6 are diagrams for illustrating hydraulic pressure adjusting units according to various embodiments of the pipe unit of FIG. 2, and FIG. 7 is a diagram for illustrating a valve unit of the battery rack of FIG. 1.

Referring to FIGS. 1 to 7, a battery rack 10 may include a battery module 100, a rack case 200, a coolant tank 300, a pipe unit 400, a valve unit 500, a temperature sensor 600, and a control unit 700.

The battery module 100 may be provided in plural. The plurality of battery modules 100 may be stacked on each other along an upper and lower direction of the battery rack 10. Each of the plurality of battery modules 100 may include at least one battery cell 110. Hereinafter, in this embodiment, each of the plurality of battery modules 100 will be described as including a plurality of battery cells 110.

The plurality of battery cells 110 may be provided as secondary batteries, respectively. Specifically, the plurality of battery cells 110 may include at least one of pouch-type secondary batteries, rectangular secondary batteries, and cylindrical secondary batteries. Hereinafter, in this embodiment, it will be described that the plurality of battery cells 110 are pouch-type secondary batteries.

The rack case 200 may accommodate the plurality of battery modules 100. The rack case 200 may accommodate the plurality of battery modules 100 to be stacked on each other in an upper and lower direction.

The coolant tank 300 may be provided to an upper side of the rack case 200. The coolant tank 300 may contain a predetermined coolant therein. Accordingly, an accommodation space capable of accommodating the coolant may be provided in the coolant tank 300. Here, the coolant may be provided as a liquid coolant. As an example, the coolant may be water. Hereinafter, in this embodiment, the coolant will be described as water.

The pipe unit 400 may connect the coolant tank 300 and the plurality of battery modules 100. The pipe unit 400 may guide the coolant of the coolant tank 300, namely the water, to be supplied to the plurality of battery modules 100.

The pipe unit 400 may include a main pipe 410, a module pipe 430, and a hydraulic pressure adjusting unit 450.

The main pipe 410 is connected to a valve unit 500, explained later, and may be elongated to have a predetermined length along an upper and lower direction of the rack case 200. The main pipe 200 may be spaced apart from the rack case 200 by a predetermined interval.

The module pipe 430 is connected to the main pipe 410 and may be disposed in a horizontal direction from the main pipe 410. The module pipe 430 is provided in plural, and the plurality of module pipes 430 may be connected to the battery modules 100, respectively.

The plurality of module pipes 430 may be disposed to be spaced apart from each other by a predetermined distance along the upper and lower direction of the rack case 200. The plurality of module pipes 430 may connect the main pipe 410 and the plurality of battery modules 100 to each other.

Each of the plurality of module pipes 430 may include a module valve 435.

The module valve 435 may be provided to an internal flow path of each module pipe 430 to opened or closed. The module valve 435 may be electrically connected to a control unit 700, explained later. Each module valve 435 may be operated to open or close the internal flow path of the module pipe 430 according to the control of the control unit 700, explained later.

Meanwhile, the module valve 435 may also be configured to be opened or closed in a manner other than the control of the control unit 700. As an example, the module valve 435 may be provided as a member that is melted down or cut off at a preset temperature or above to open the internal flow path of the module pipe 430 when the battery module 100 is abnormally heated, in a state of being mounted in the module pipe 430 to close the internal flow path of the module pipe 430.

The hydraulic pressure adjusting unit 450 is for adjusting a hydraulic pressure according to the height of the main pipe 410, and may be provided to an inner wall of the main pipe 410. Specifically, the hydraulic pressure adjusting unit 450 may be provided in plural, and the plurality of hydraulic pressure adjusting units 450 may be disposed between the plurality of module pipes 430, respectively, in an upper and lower direction of the main pipe 410.

The plurality of hydraulic pressure adjusting units 450 may be formed to protrude by a predetermined length from the inner wall of the main pipe 410 toward a central portion of the main pipe 410. The inner diameter of the main pipe 410 having the plurality of hydraulic pressure adjusting units 450 may be relatively reduced smaller than the inner diameter of the main pipe 410 not having the plurality of hydraulic pressure adjusting units 450. Accordingly, a pipe loss may occur in the space of the main pipe 410 having the plurality of hydraulic pressure adjusting units 450 between the plurality of module pipes 430. When the water flows through the main pipe 410, this pipe loss offsets the pressure increased by gravity, so that the water may be supplied more evenly regardless of the height at any place of the plurality of module pipes 430.

That is, since the hydraulic pressure is adjusted according to the height of the main pipe 410 by means of the plurality of hydraulic pressure adjusting units 450, when the water is supplied, the water may be fed evenly at any place of the plurality of battery modules 100, including an upper side, a lower side and a center side of the plurality of battery modules 100. Consequently, the plurality of hydraulic pressure adjusting units 450 may guide the water to be input with a uniform flux regardless of the height of the battery modules 100.

Meanwhile, the plurality of hydraulic pressure adjusting units 450 may also have other structures capable of causing a piping loss of the main pipe 410. That is, as shown in FIG. 5, a plurality of hydraulic pressure adjusting units 460 may be provided as a plurality of ribs that protrude from the inner wall of the main pipe 410 toward the center of the main pipe 410 in a radial direction, and, as shown in FIG. 6, a plurality of hydraulic pressure adjusting units 470 may be provided in a disk shape in which a plurality of holes are formed.

The valve unit 500 is provided between the pipe unit 400 and the coolant tank 300, and when at least one battery module 100 among the plurality of battery modules 100 has a predetermined temperature or above, the valve unit 500 may be opened to feed the water in the coolant tank 300 to the pipe unit 400 so that the water is supplied to the battery module 100 over the predetermined temperature.

The valve unit 500 may include a valve body 510 and an opening/closing valve 530.

The valve body 510 may connect the coolant tank 300 and the pipe unit 400. A valve flow path 515 for the flow of the water may be provided inside the valve body 510.

The opening/closing valve 530 is provided to be opened or closed in the valve body 510, and may be disposed near the coolant tank 300. The opening/closing valve 530 may close the valve flow path 515 when the temperature of the plurality of battery modules 100 is lower than a predetermined temperature, and open the valve flow path 515 when the temperature of at least one battery module 100 among the plurality of battery modules 100 is higher than the predetermined temperature.

The temperature sensor 600 is provided to the rack case 200, and may sense the temperature of the plurality of battery modules 100. The temperature sensor 600 may be provided in plural. The plurality of temperature sensors 600 may be disposed close to the battery modules 100, respectively.

The control unit 700 may be electrically connected to various the plurality of battery modules 100, the plurality of temperature sensors 600, the module valve 435, the valve unit 500, and various electric components of the battery rack 10 to control the operations of the battery rack 10. For example, when a fire occurs due to abnormal heat generation of at least one battery module 100 among the plurality of battery modules 100, the control unit 700 may control the operation of the opening/closing valve 530 of the valve unit 500 and the operation of the module valve 435 of the module pipe 430 connected to the at least one battery module 100 at which the abnormal heat generation occurs.

Hereinafter, the operation of the battery rack 10 when at least one battery module 100 of the battery rack 10 according to this embodiment is abnormally heated will be described in more detail.

Figure 8:
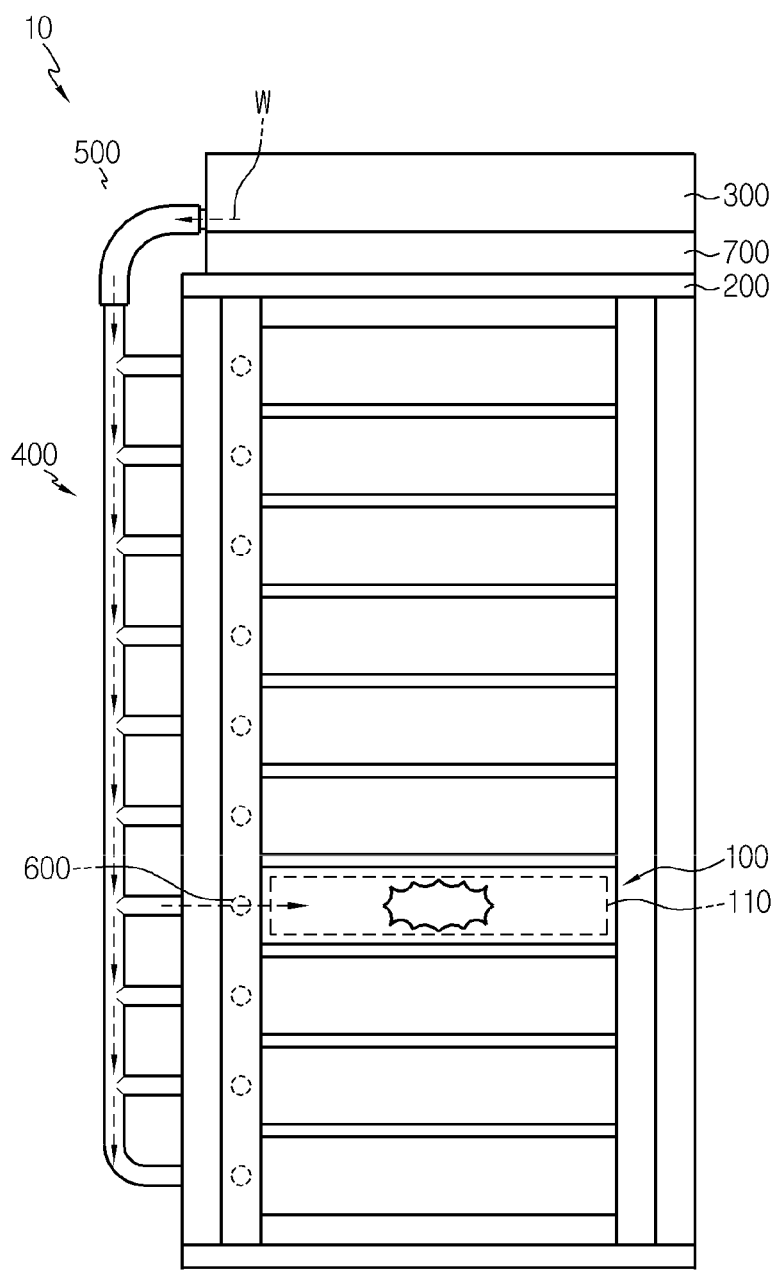
FIGS. 8 to 10 are diagrams for illustrating an operation of the battery rack when at least one battery module of the battery rack of FIG. 1 is abnormally heated.
Figure 9:
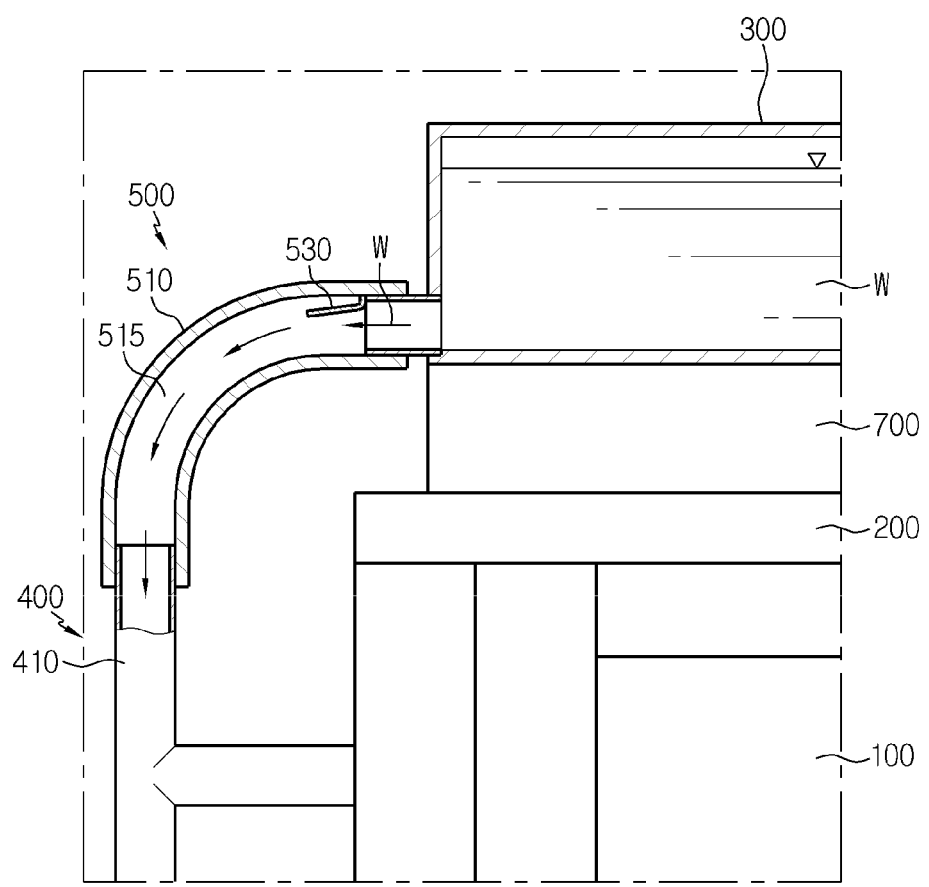
Figure 10:
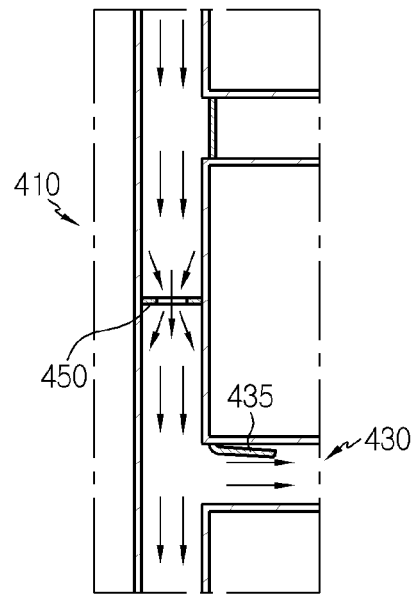

FIGS. 8 to 10 are diagrams for illustrating an operation of the battery rack when at least one battery module of the battery rack of FIG. 1 is abnormally heated.

Referring to FIGS. 8 to 10, temperature may increase rapidly due to abnormal heat generation in at least one battery module 100 among the plurality of battery modules 100 of the battery rack 10. When a fire occurs in the battery module 100 that is abnormally heated, if the fire is transferred to adjacent battery modules 100, a greater risk such as explosion of the entire battery racks 10 may occur, so it is needed to rapidly block the transfer of the fire. That is, when at least one of the battery modules 100 ignites, it is necessary to more quickly block the propagation of flame and heat toward adjacent battery modules 100.

In this embodiment, when the temperature rises due to abnormal heat generation in at least one battery module 100 among the plurality of battery modules 100 of the battery rack 10, first, the temperature sensor 600 near the battery module 100 whose temperature rises due to abnormal heat generation or the like may sense the temperature rise. After that, if the temperature sensed by the temperature sensor 600 is higher than a preset predetermined temperature, the control unit 700 may open the opening/closing valve 530 of the valve unit 500 and the module valve 435 of the module pipe 430 connected to the battery module 100 that is heated over the preset predetermined temperature.

As the opening/closing valve 530 of the valve unit 500 is opened, the water W contained in the coolant tank 300 may be supplied to the pipe unit 400 along the valve flow path 515 of the valve body 510 of the valve unit 500.

After that, the water W supplied to the main pipe 410 of the pipe unit 400 may flow toward the module pipe 430 at which the module valve 435 is opened, among the plurality of module pipes 430, and be supplied to the battery module 100 that is heated abnormally.

Accordingly, the water is supplied to the battery module 100 that is abnormally heated, so that the battery module 100 having the abnormal heat may be cooled more quickly. That is, in this embodiment, by using the water in the coolant tank 300, when a situation such as abnormal heat occurs, emergency cooling may be implemented by supplying the water to the battery module 100 that is abnormally heated. Thus, when at least one of the battery modules 100 ignites, the propagation of flame and heat to adjacent battery modules 100 may be prevented more quickly.

Meanwhile, when the water is supplied, the plurality of hydraulic pressure adjusting units 450 provided to the main pipe 410 may adjust the hydraulic pressure according to the height of the main pipe 410 so that the is supplied with the same flux at any place of the plurality of battery modules 100. That is, in this embodiment, it is possible to guide the water W to be input evenly regardless of the height of the stacked battery modules 100 by means of the plurality of hydraulic pressure adjusting units 450.

In other words, when supplying water for cooling the abnormally heated battery module 100, the water may be guided to be input with a uniform flux by means of the hydraulic pressure adjusting units 450 regardless of the stack height, even though the stack height is different, for example in a case where a battery module 100 at an upper side is abnormally heated among the stacked battery modules 100, in a case where a battery module 100 at a lower side is abnormally heated, in a case where a battery module 100 at the center is abnormally heated, or the like.

By using the plurality of hydraulic pressure adjusting units 450 as described above, the water supplied when the battery module 100 stacked at an upper side is abnormally heated, the water supplied when the battery module 100 stacked at a lower side is abnormally heated, and the water supplied when the battery module 100 stacked at the center may be supplied with a uniform flux.

Figure 11:
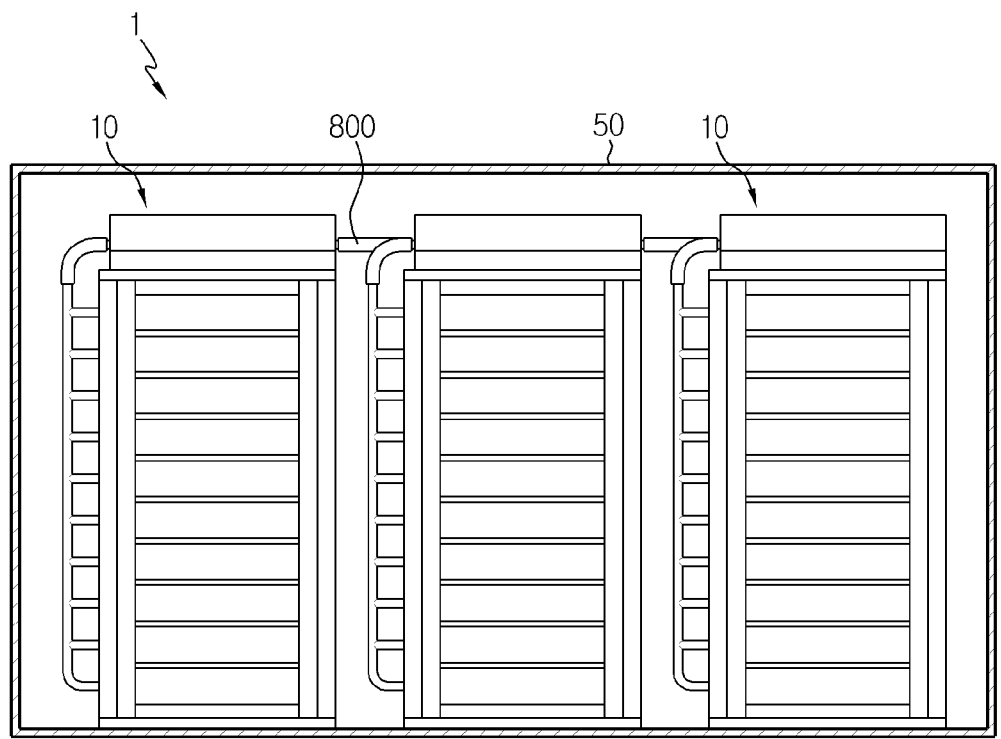
FIG. 11 is a diagram for illustrating an energy storage system according to an embodiment of the present disclosure.

FIG. 11 is a diagram for illustrating an energy storage system according to an embodiment of the present disclosure.

Referring to FIG. 11, an energy storage system 1 is an energy source and may be used for home or industrial use. The energy storage system 1 may include at least one battery rack 10 of the former embodiment, or a plurality of battery racks 10 in this embodiment, and a rack container 50 for accommodating the plurality of battery racks 10.

Meanwhile, a flux supplement unit 800 for connecting the coolant tanks may be provided between the plurality of battery racks 10, respectively. When the water in the coolant tank of any one battery rack 10 decreases, the flux supplement unit 800 may supply water from a coolant tank that is relatively filled with water to the coolant tank where water is decreasing.

Since the energy storage system 1 according to this embodiment includes the battery rack 10 of the former embodiment, it is possible to provide an energy storage system 1 that includes all the advantages of the battery rack 10 of the former embodiment.

According to various embodiments as above, it is possible to provide a battery rack 10, which may prevent the propagation of flame and heat to adjacent battery modules 100 more rapidly when ignition occurs in at least one of battery modules 100, and an energy storage system 1 including the battery rack 10.

While the embodiments of the present disclosure have been shown and described, it should be understood that the present disclosure is not limited to the specific embodiments described, and that various changes and modifications can be made within the scope of the present disclosure by those skilled in the art, and these modifications should not be understood individually from the technical ideas and views of the present disclosure.

What is claimed is:

1. A battery rack, comprising:
   a plurality of battery modules stacked on each other along a vertical direction of the battery rack, each battery module of the plurality of battery modules having at least one battery cell;
   a rack case configured to accommodate the plurality of battery modules;
   a coolant tank provided to an upper side of the rack case and containing a coolant;
   a pipe configured to connect the coolant tank and the plurality of battery modules; and
   a valve provided between the pipe and the coolant tank and configured to be opened when at least one battery module of the plurality of battery modules has a temperature over a predetermined temperature to discharge the coolant of the coolant tank to the pipe so that the coolant is supplied to the at least one battery module having a temperature over the predetermined temperature,
   wherein the pipe includes:
      a main pipe connected to the valve; and
      a plurality of module pipes connected to the main pipe and respectively connected to the plurality of battery modules,
   wherein each of the plurality of module pipes has a module valve to control flow from the main pipe,
   wherein the main pipe includes at least one hydraulic pressure adjuster configured to adjust a hydraulic pressure according to a height of the main pipe, and
   wherein the at least one hydraulic pressure adjuster is a restriction in the main pipe.

2. The battery rack according to claim 1, further comprising:
   at least one temperature sensor provided to the rack case to sense the temperature of the plurality of battery modules.

3. The battery rack according to claim 2, wherein the valve includes:
   a valve body configured to connect the coolant tank and the pipe and having a valve flow path for the flow of the coolant; and
   an opening/closing valve provided to be opened or closed in the valve body and configured to close the valve flow path when the temperature of the plurality of battery modules is lower than the predetermined temperature and to open the valve flow path when the temperature of the at least one battery module of the plurality of battery modules is higher than the predetermined temperature.

4. The battery rack according to claim 3, further comprising:
   a control unit electrically connected to the at least one temperature sensor and the valve to control the operation of the valve.

5. The battery rack according to claim 1, wherein the main pipe is elongated to have a predetermined length along the vertical direction of the rack case.

6. The battery rack according to claim 1, wherein the plurality of module pipes are disposed to be spaced apart from each other by a predetermined distance along the vertical direction of the rack case.

7. The battery rack according to claim 1, wherein the at least one hydraulic pressure adjuster is provided to an inner wall of the main pipe and is disposed between the plurality of module pipes, respectively, in a vertical direction of the main pipe.

8. The battery rack according to claim 1, wherein the coolant is water.

9. An energy storage system, comprising at least one battery rack as defined in claim 1.

10. The battery rack according to claim 1, wherein each module valve is at a junction of the main pipe a respective one of the module pipes.

11. The battery rack according to claim 1, wherein each module valve is controlled by a temperature sensor.

12. The battery rack according to claim 1, wherein the at least one hydraulic pressure adjuster is a plurality of hydraulic pressure adjusters spaced along a length of the main pipe.

* * * * *